US011609779B2

(12) United States Patent
Freund et al.

(10) Patent No.: US 11,609,779 B2
(45) Date of Patent: Mar. 21, 2023

(54) METHOD AND SYSTEMS FOR ADMINISTERING VIRTUAL MACHINES TO CLIENT DEVICES

(71) Applicant: SHADOW, Paris (FR)

(72) Inventors: Emmanuel Freund, Paris (FR); Eric Garrigues, Champigny sur Marne (FR); Maxime Mouret, Paris (FR)

(73) Assignee: Shadow, Paris (FR)

( * ) Notice: Subject to any disclaimer, the term of this patent is extended or adjusted under 35 U.S.C. 154(b) by 134 days.

(21) Appl. No.: 17/316,226

(22) Filed: May 10, 2021

(65) Prior Publication Data

US 2021/0263764 A1 Aug. 26, 2021

Related U.S. Application Data

(63) Continuation of application No. 16/213,327, filed on Dec. 7, 2018, now abandoned.

(30) Foreign Application Priority Data

Sep. 20, 2018 (FR) ...................................... 1858532

(51) Int. Cl.
*G06F 9/455* (2018.01)
(52) U.S. Cl.
CPC ...... *G06F 9/45558* (2013.01); *G06F 9/45545* (2013.01); *G06F 2009/4557* (2013.01)
(58) Field of Classification Search
CPC ................................................ G06F 9/45558
See application file for complete search history.

(56) References Cited

U.S. PATENT DOCUMENTS

| 7,774,467 | B1 | 8/2010 | Martin et al. |
| 8,392,596 | B2 | 3/2013 | Kamay |
| 10,572,294 | B1 * | 2/2020 | Chawda .............. G06F 9/44505 |

(Continued)

FOREIGN PATENT DOCUMENTS

FR  3047576 A1  8/2017

OTHER PUBLICATIONS

French Preliminary Search Report for French Application No. 1858532 dated Jul. 4, 2019, 2 pages.

(Continued)

*Primary Examiner* — Charlie Sun
(74) *Attorney, Agent, or Firm* — TraskBritt

(57) ABSTRACT

Methods for executing application programs in computer systems including a host computer formed of a plurality of servers configured to execute at least one virtual machine each hosting a primary user session associated to a remote client and at least one additional server may involve transmitting a primary session stream between the virtual machine and the remote client to emulate the presence, at the remote client, of a physical computer system. The execution of the application program may be initiated in a secondary user session hosted on the additional server and preparing a secondary session stream of the secondary user session. The primary and the secondary session streams may be aggregated to form an aggregated session stream, and the aggregated session stream may be processed at the remote client to emulate the execution of the application program on the physical computer system.

17 Claims, 1 Drawing Sheet

(56) References Cited

U.S. PATENT DOCUMENTS

| | | |
|---|---|---|
| 2011/0004649 A1 | 1/2011 | Nord et al. |
| 2011/0246904 A1 | 10/2011 | Pinto et al. |
| 2011/0307614 A1 | 12/2011 | Bernardi et al. |
| 2012/0096077 A1 | 4/2012 | Weerts et al. |
| 2015/0081910 A1 | 3/2015 | Assuncao et al. |
| 2016/0028789 A1 | 1/2016 | Inomata et al. |
| 2017/0185438 A1 | 6/2017 | Thomas et al. |
| 2017/0228851 A1 | 8/2017 | Freund et al. |
| 2018/0211445 A1 | 7/2018 | Ichikawa et al. |

OTHER PUBLICATIONS

Zhang et al., Redar: A Remote Desktop Architecture for the Distributed Virtual Personal Computing, Grid and Cooperative Computing, Fifth International Conference, IEEE, (Oct. 1, 2006), pp. 1-8.

\* cited by examiner

METHOD AND SYSTEMS FOR ADMINISTERING VIRTUAL MACHINES TO CLIENT DEVICES

CROSS-REFERENCE TO RELATED APPLICATIONS

This is a continuation of U.S. patent application Ser. No. 16/213,327, filed Dec. 7, 2018, which, pursuant to 35 U.S.C. § 119(a), claims the benefit of the filing date of French Patent Application Serial No. 1858532, filed Sep. 20, 2018, for "A Method for Executing an Application Program in a Computer System," the contents of each of which are hereby incorporated herein in their entirety by this reference.

TECHNICAL FIELD

This disclosure describes methods and systems for executing an application program in a computer system. More particularly, this disclosure describes methods and systems for more efficiently administering virtual machines to client devices utilizing unconventional hardware configurations and software programming for division of resources.

BACKGROUND

US2017/0228851 and FR3047576 disclose computing system configurations wherein the user interface devices (display, keyboard, etc.) are separated from the application processing component. The user interface devices are located at the desktop of the user (also referred to as the "client") while the processing and storage components of the computer are placed in a remote hosting location. The user interface devices then have access, at the host computer, to a dedicated virtual machine through a network (most usually the Internet), the virtual machine emulating the required processing, storage, and other computing resources. The host computer hosts the operating system and software applications utilized by the clients, thus limiting processing resources on the clients' side.

The host computer usually consists of a plurality of physical computing systems (servers) each hosting a plurality of virtual machines. Each virtual machine is connected to a client and provides a dedicated virtual environment to emulate the functions of a physical personal computer, including graphic data processing, and provides the display information of the user session to the client screen. The data to be displayed are transferred through the network to the client. The client possesses sufficient computing resources to receive the data flow and display them. The client is also provided with input/output devices (keyboard, mouse, etc.) to exchange control information or instruction to the virtual machine, via the network.

The user interface devices are therefore heavily dependent on the host computer that fulfills the computational roles for the clients.

BRIEF SUMMARY

To this effect, the disclosure relates to methods for executing an application program in computer systems, the computer systems comprising, for example: a host computer formed of a plurality of servers configured to execute at least one virtual machine each hosting a primary user session associated to a remote client; and at least one additional server.

Methods in accordance with this disclosure may involve transmitting a primary session stream between the virtual machine and the remote client to emulate the presence, at the remote client, of a physical computer system; initiating the execution of the application program in a secondary user session hosted on the additional server and preparing a secondary session stream of the secondary user session; and aggregating the primary and the secondary session stream to form an aggregated session stream, and processing the aggregated session stream at the remote client to emulate the execution of the application program on the physical computer system.

By combining virtual machines running on a shared server and additional servers for execution of certain computing intensive application programs, the proposed method provides to the user an excellent level of service, while reducing (e.g., minimizing) the computing resources, notably hardware resources, necessary to achieve this level of service.

According to further non-limitative features of the disclosure, either taken alone or in any technically feasible combination:
  initiating the execution of the application program comprises intercepting a user request for executing an application program or for installing an application program, by a monitoring process of the primary user session;
  the secondary user session is hosted directly on the additional server or the secondary user session is hosted in a virtual machine executing on the additional server;
  the computing system comprises a plurality of servers and the step of initiating the execution of the application program comprises the selection of the additional server among the plurality of servers;
  the selection of the additional server comprises selecting among the plurality of additional server, the additional server that is best configured to execute the application program;
  initiating the execution of the application program comprises initiation of the secondary user session on the additional server;
  the computing system comprises a storage server associated to the server of host computer and an additional storage server associated with the additional server;
  initiating the execution of the application program comprises copying at least part of a user context stored in the storage server to the additional storage server;
  the primary and secondary session streams are communicated to the remote client and the step of aggregating the primary and the secondary session streams is performed at the remote client;
  wherein the computing system comprises an aggregation server, the primary and secondary session streams are communicated to the aggregation server, and wherein the step of aggregating the primary and secondary session streams is performed at the aggregation server.

BRIEF DESCRIPTION OF THE DRAWINGS

Many other features and advantages of this disclosure will become apparent from reading the following detailed description, when considered in conjunction with the accompanying drawings, in which.

DETAILED DESCRIPTION

In the following description, detailed descriptions of known functions and elements that may unnecessarily make the gist of this disclosure obscure will be omitted.

Methods in accordance with this disclosure provide that, in such a computer system configuration, additional processing capacity be provided to the client. More particularly, the proposed method enables dedicating, for a period of time, computing resources for executing a computing intensive application program, and without allocating those resources permanently to a client.

Figure 1:
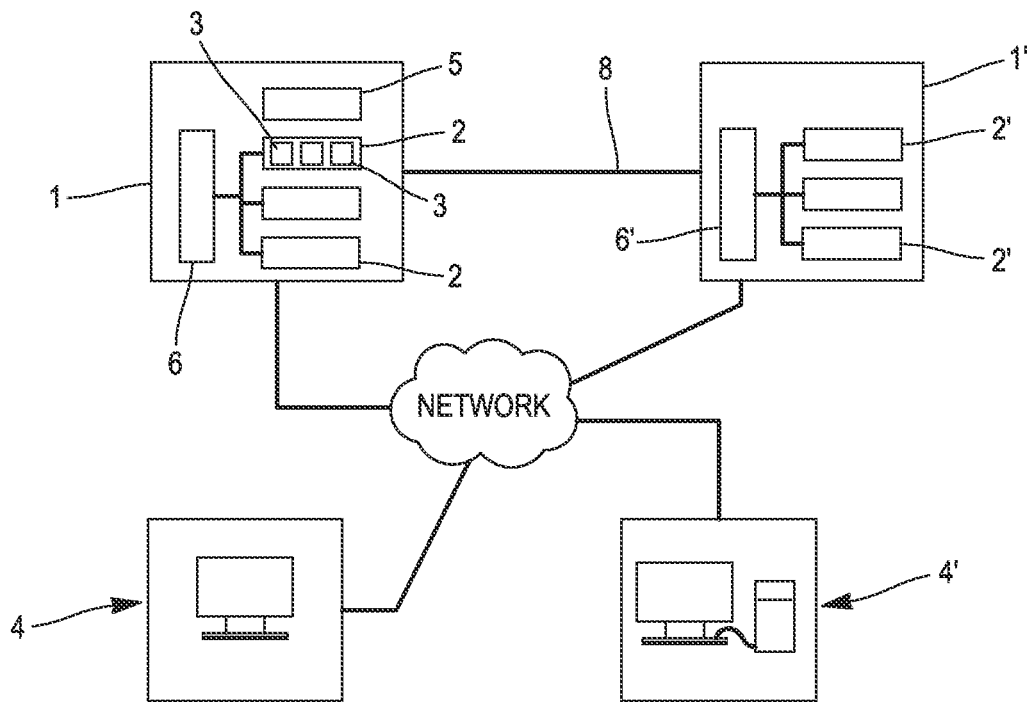
FIG. 1 represents a computing system configuration according to one embodiment of the present disclosure.

In FIG. 1, a computing architecture comprises a host computer 1 presenting a plurality of servers 2. Host computer 1 also comprises a storage server 6 for providing storage capacity. The servers 2 may be configured to host one or a plurality of virtual machines 3, along with its operating system and applications. Virtualization allows a plurality of virtual machines 3 to be hosted into each server 2 while providing a plurality of completely isolated virtual environments within a single server 2.

Each of the virtual machine 3 in host computer 1 may be dedicated to one particular user. The user contexts, i.e., the operating system, application programs and user data that are dedicated to each user, are stored in respective portions of the nontransitory storage capacity managed by storage server 6. The users interact with their dedicated virtual machine 3, from remote clients 4, 4' each connected to the host computer 1 through a network, such as the Internet. Since most, if not all, of the processing is performed at host computer 1, the remote clients 4, 4' may be kept very simple and may comprise, for instance, a simple terminal, network connector and basic input/output devices (keyboard, mouse, etc.), such as represented by remote client 4 on FIG. 1. Alternatively, suitable remote clients 4, 4' could be a standard personal computer, with its own CPU, graphic card, peripherals, etc., such as represented by remote client 4'. Remote clients 4, 4' are not limited to a particular form, and may consist of any computing device, such as a tablet, a personal computer or a smartphone.

Each server 2 is preferably hosting fewer than ten virtual machines 3 to provide sufficient computing resources to each virtual machine 3 for executing applications with a sufficient level of service. Each virtual machine 3 is created upon client connection and is associated to the corresponding user context. To this end, a management process running on a master server 5 of host computer 1 may be provided to initiate, terminate and, more generally, operate the virtual machines of host computer 1. Each virtual machine 3 includes a virtual CPU, a virtual main memory, one virtual or physical graphic card, and other resources. Each virtual machine 3 constitutes or is equivalent to a user session, and a large number of such user sessions may be executed on the servers 2 of the host computer 1.

To emulate the presence of a physical computer system at the remote client terminal, the host computer 1 provides, through the network, to the remote client 4, 4' display, sounds and control information for input/output devices located at the remote site. Conversely, the remote clients 4, 4' are providing to the host computer 1 control information from input/output devices located at the remote site (keyboard, mouse), and possibly other forms of data such as display and sound information provided by a USB or built in camera and microphone of the remote client 4, 4', or network devices at the remote client locations, such as printers.

A capture process of each user session 3 prepares the display data, sound data and other types of information for their communication to the associated client 4, 4'. The capture process also collects the information received from the client 4, 4' so that they can be processed by the user session 3. Similarly, the remote clients 4, 4' are provided with appropriate hardware and/or software resources to decode/encode the information received from host computer 1 before they are displayed, or more generally used on the client side, or the information transmitted to the host computer 1. All the information exchanged between a user session 3 and a remote client 4, 4' will be referred to as "session stream" in the present disclosure.

Pursuing description of FIG. 1, the computing architecture also comprises a plurality of additional servers 2' and at least one additional storage server 6', here located in a secondary host computer 1'. The additional servers 2' form computing resources that can be allocated to one remote client 4, 4', non-permanently, for executing a computing intensive application program. Additional storage server 6' is storing at least one such application program, and preferably a plurality of such application programs. Advantageously, the application programs stored on additional storage server 6' are known to require important computing resources, such that their execution in a virtual environment may appear imperfect to a user. The application programs stored in the secondary host computer 1' may be executed directly on the additional servers 2', as it will be explained in greater details in a further portion of this disclosure. Each additional server 2' is preferably constituted of high-end computing components (processor(s), memory, one or more graphic cards, storage) such that applications may execute effectively on such a server. In a particular embodiment, the additional servers 2' are configured to execute efficiently the application programs stored in additional storage server 2'. Some additional servers 2' may be set up, in terms of graphic card type, memory capacity, type of CPU, to perfectly match the need of a particular program of the additional storage server 2'. This embodiment is advantageous since it allows to adjust the computing resources of secondary host computer 1' to what is exactly needed to execute efficiently the selected application programs stored in additional storage server 6'. Since these application programs are executed on the additional servers 2', it is not necessary for the servers 2 of the host computer 1 to be formed of higher end components, in term of performance and capacity.

It is not necessary that the additional servers 2' and storage server 6' be located in a separate secondary host computer 1' as represented in FIG. 1. When this is the case, the host computer 1 and secondary host computer 1' are communicating over a communication link 8 such that information may flow without excessive delay from one host to the other. More generally, there may be any number of interconnected host computers, each host comprising a plurality of servers 2 for hosting virtual machines and/or additional servers 2'. In one configuration, the servers 2, additional servers 2', storage and additional storage server 6, 6' are all part of a single host computer 1. Storage and additional storage may be part of a single storage server of host computer 1.

A method according to the present disclosure proposes to execute an application program stored in additional storage server 6' on an additional server 2'. This execution may be performed directly on the additional server 2' or within a virtual machine hosted on the additional server 2'. By "directly," it is meant that a user session is executed on the physical hardware of the additional server 2', without the use of a virtual environment. In other terms, the computing resources of the additional server are directly allocated to the execution of the user session and of the application program.

According to this method, a user is initially logged from remote client 4, 4' into a primary user session, hosted in a server 2 of host computer 1. A primary session stream is transmitted between the user session and the remote client, to emulate the presence of a physical computer system at the remote client, as explained in detail in the preceding part of this disclosure. This step is represented as step S1 on FIG. 2.

The user initiates the execution of an application program that requires important computing resources, by any appropriate means, e.g., using a mouse or a command line or by voice control. Rather than starting the execution of the application program within the virtual machine, the application program is executed in a secondary user session on an additional server 2', as this is represented as step S2 on FIG. 2.

Detecting the initiation of the application program may be performed in multiple manners. For instance, each primary user session may execute a background monitoring process, launched at the startup of the primary user session, and configured to intercept a user's request for initiating an application program. This process may compare the requested application program with a list of applications whose execution should be performed on the additional server 2'. This list may correspond to the list of application programs stored in secondary storage server 6'.

Alternatively, the monitoring process may intercept a user's request for installing a new application program, and instead, if the new application program is identified as requiring high-processing power, installing a redirect program in the user session. The redirect program may appear to the user, on the desktop of the primary user session, identical to the requested new program but is configured to initiate the execution of the application program on additional server 2' rather than in the virtual environment of server 2 of host computer 1.

In another variant, the monitoring process may provide the choice to the user, upon intercepting a request to execute an application program or to install a new application program, to initiate the execution of this program in the primary user session of server 2 or to a secondary user session on an allocated additional server 2'.

Different substeps may be required to initiate the execution of the application program on additional server 2'. Those substeps may be coordinated, for instance, by a coordination process running on the master server 5 of host computer 1 or of secondary host computer 1'. A message from the monitoring process or redirect program indicating the requesting user session and/or remote client and the requested application program may be addressed to the coordination process to trigger the execution of at least some of these substeps.

The substeps may comprise the selection of one additional server 2' from the secondary host computer 1' for execution of the requested application program, from the available additional servers 2'. The allocated additional server will be used, possibly exclusively, for executing the requested program. In some instances, it will host a unique secondary user session. In other instance, it will host one or a very limited number of virtual machines for executing one or a limited number of user sessions. Advantageously, this substep selects the server that is most adapted, in terms of hardware and/or software configuration, to the execution of the requested software program. For that purpose, the coordination process may maintain a list of application programs/ additional servers that are best matched together.

The substep also comprises the initiation of a secondary user session in the allocated additional server 2', either directly or within a virtual machine, and uploading the requested application program from additional storage server 6' in the user session.

The substeps may also comprise the transfer of at least part of the user context from storage server 6 of host computer 1 to the additional storage server 6' of secondary host computer 1'. In this way, the requested application program may be executed on the additional server 2' while having access to the user data such that the secondary user session and the application program may be set up according to user preexisting preferences and access user preexisting documents or data.

The substeps comprise, within the secondary user session, the execution of a capturing process, similar to the one being executed in the primary user session, to prepare a secondary session stream. Accordingly, the secondary session stream incorporates all display data, sound data, and other information such as control data to be exchanged between the secondary user session and the remote client 4, 4'. In a particular embodiment, not all the data and information are incorporated in the secondary session streams, but only those display data that relates to the application program. For instance, only display data of the session window into which the application program is running are incorporated in the secondary session stream. Position and/or size of the window may also be incorporated into the secondary session stream, so that streamed data may be reconstituted on the receiving side.

Figure 2:
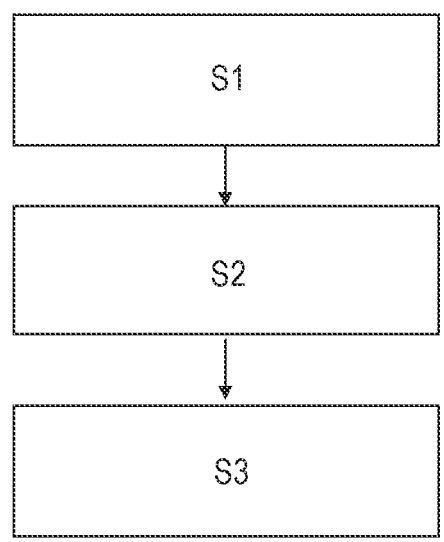
FIG. 2 represents the main step of a method according to the disclosure.

Referring back to the general method for executing an application program of FIG. 2, the method further comprises a step S3 of aggregating the primary and secondary session streams to form an aggregated stream. This aggregated session stream is then processed at the remote client 4, 4', for instance, to display a unified session on the remote client screen. To the user, the application program appears to be executed on the remote client, on the emulated physical computer system.

The aggregation of session streams may be performed at the remote client 4, 4'. In such case, primary and secondary session streams are each transmitted to that client separately over the network. The client 4, 4' is provided with appropriate hardware and software for preparing the aggregated stream before they are displayed or processed to the user. Alternatively, primary and secondary session streams are directed by the respective capture process of the primary and secondary user session to a separate aggregation server. The aggregation server, that may be located at host computer 1 or secondary host computer 1' or at any other location, combines the two streams before communicating the aggregated stream to the remote client 4, 4' over the network. The step of directing primary and secondary session streams may be performed, for instance, by the coordination process of the master server 5.

By aggregating streams, it is meant that only relevant portions of the two streams are integrated into the resulting integrated stream. More precisely, the secondary session stream is given priority and only complementary information from the primary session stream, if necessary, is incorporated into the aggregated stream. For instance, if the application program is running in a full-screen mode in the secondary user session, the aggregation server or remote client will discard all display data from the primary session stream, such that only display data from the secondary user session will be displayed at the remote client 4, 4'. It may, however, incorporate sound data and other information from the primary session stream into the aggregated stream. If the application program is running in a window mode of the secondary user session, the aggregation server or remote client will complement the display data of the secondary session, outside of the window, with display data from the primary session stream.

By providing an additional server 2' for the execution of a requested application program, within a secondary user session that has preferably access to the user context, the application program can be executed very efficiently, for instance, without excessive execution latency. By aggregating the primary and secondary user session, the dedicated resources are provided transparently to the user, as if he was operating a single very high end personal computer at its remote location.

Once the application program is terminated by the user, the secondary user session may be closed and the additional server 2' released. User data that have been duplicated into the additional storage server 6' may be updated into the user context of storage server 6 of host computer 1, to reflect the changes that may have been made while the application program was running. Primary session stream is redirected to the remote client if it was directed to an aggregation server.

The disclosed method and computing architecture combining virtual machines running on a shared server and additional servers for execution of certain computing intensive application programs allow to provide to the user an excellent level of service, while minimizing the computing resources, notably hardware resources, necessary to achieve this level of service. It notably avoids transferring the complete primary session from one server to another, more powerful, server when the user wishes to execute computing intensive application programs. Such transfer would introduce unacceptable delays for the users.

Other variations to the disclosed embodiments can be understood and effected by those skilled in the art in practicing the claimed invention, from a study of the drawings, this disclosure, and the appended claims.

What is claimed is:

1. A method for executing an application program in a computer system, the computer system comprising:
    a host computer formed of a plurality of servers configured to execute at least one virtual machine each hosting a primary user session associated to a remote client; and
    at least one additional server;
    the method comprising:
        transmitting a primary session stream of the primary user session between the virtual machine and the remote client to emulate a presence, at the remote client, of a physical computer system;
        intercepting, by a monitoring process of the primary user session, a request for executing or installing the application program in the primary session;
        initiating the execution of the application program in a secondary user session hosted on the at least one additional server and preparing a secondary session stream of the secondary user session;
        aggregating the primary session stream and the secondary session stream to form an aggregated session stream by prioritizing display of the secondary session stream over non-complementary information from the primary session stream, and transmitting the aggregated session stream for processing at the remote client to emulate the execution of the application program on the physical computer system.

2. The method of claim 1, wherein the secondary user session is hosted directly on the at least one additional server.

3. The method of claim 2, wherein the secondary user session is hosted in a virtual machine executed on the at least one additional server.

4. The method of claim 1, wherein initiating the execution of the application program comprises selecting the at least one additional server from among the plurality of servers.

5. The method of claim 4, wherein selecting the additional server comprises selecting the additional server having a hardware configuration that is best configured to execute the application program from among the plurality of servers.

6. The method of claim 1, wherein the computing system comprises a storage server operatively connected to the plurality of servers of the host computer and an additional storage server operatively connected to the at least one additional server.

7. The method of claim 6, wherein initiating the execution of the application program comprises copying at least part of a user context stored in the storage server to the additional storage server.

8. The method of claim 1, wherein aggregating the primary session stream and the secondary session stream comprises discarding all information from the primary session stream when the secondary session stream indicates that the application program is running in full-screen mode.

9. The method of claim 1, wherein the computing system comprises an aggregation server, the primary and secondary session streams are communicated to the aggregation server, and wherein aggregating the primary and secondary session streams is performed at the aggregation server.

10. A system for administering virtual machines to client devices, comprising:
    a primary host computer comprising a first plurality of servers; and
    a secondary host computer comprising a second plurality of servers;
    wherein the primary host computer comprises a first storage server having a first nontransitory memory device storing software instructions that, when executed, cause the primary host computer to:
        initiate a primary session stream comprising at least an operating system for a virtual machine utilizing the first plurality of servers in response to a request from a client device;
    wherein the secondary host computer comprises a secondary storage server having a second nontransitory memory device storing software instructions that, when executed, cause the secondary host computer to:
        initiate a secondary session stream comprising an application program for the virtual machine utilizing the second plurality of servers in response to a request from a client device passed to the secondary host computer by the primary host computer; and
    wherein the software instructions stored by the first nontransitory memory device, when executed, cause the primary host computer to aggregate the primary session stream and the secondary session stream to form an aggregated session stream by prioritizing display of the secondary session stream over non-complementary information from the primary session stream; and wherein the software instructions stored by the first nontransitory memory device, when executed, cause the secondary host computer to terminate the secondary session stream in response to a request from the client device passed to the secondary host computer by the primary host computer.

11. The system of claim 10, wherein the first plurality of servers has a first hardware configuration and the second plurality of servers has a second, different hardware configuration.

12. The system of claim 11, wherein the second hardware configuration of the second plurality of servers is better adapted to execution of the application program than the first hardware configuration of the first plurality of servers.

13. The system of claim 10, wherein the software instructions stored by the first nontransitory memory device, when executed, cause the primary host computer to aggregate the primary session stream and the secondary session stream by discarding all information from the primary session stream when the secondary session stream indicates that the application program is running in full-screen mode.

14. The system of claim 10, wherein the software instructions stored by the first nontransitory memory device, when executed, cause the primary host computer to aggregate the primary session stream and the secondary session stream by incorporating only complementary information from the primary session stream with all information from the secondary session stream, aggregation resulting in the complementary information from the primary session stream being located outside a window of the secondary session stream.

15. The system of claim 10, wherein the software instructions stored by the second nontransitory memory device, when executed, cause the secondary host computer to directly allocate resources from the second plurality of servers to the secondary session stream.

16. The system of claim 10, wherein the software instructions stored by the first nontransitory memory device, when executed, cause the primary host computer to compare a request to open the application program to a list of available programs on the primary host computer and the secondary host computer and to initiate the secondary session stream only with the application program is not available on the primary host computer and is available on the secondary host computer.

17. A system for administering virtual machines to client devices, comprising:
- a primary host computer comprising a first plurality of servers; and
- a secondary host computer comprising a second plurality of servers;
- wherein the primary host computer comprises a first storage server having a first nontransitory memory device storing software instructions that, when executed, cause the primary host computer to:
  - initiate a primary session stream comprising at least an operating system for a virtual machine utilizing the first plurality of servers in response to a request from a client device;
- wherein the secondary host computer comprises a secondary storage server having a second nontransitory memory device storing software instructions that, when executed, cause the secondary host computer to:
  - initiate a secondary session stream comprising an application program for the virtual machine utilizing the second plurality of servers in response to a request from a client device passed to the secondary host computer by the primary host computer; and
- wherein the software instructions stored by the first nontransitory memory device, when executed, cause the primary host computer to aggregate the primary session stream and the secondary session stream to form an aggregated session stream by prioritizing display of the secondary session stream over non-complementary information from the primary session stream; and
- wherein the software instructions stored by the first nontransitory memory device, when executed, cause the primary host computer to transmit preexisting user data to the secondary host computer to set up the application program at the secondary host computer in accordance with the preexisting user data.

\* \* \* \* \*